(12) United States Patent
Rodriguez et al.

(10) Patent No.: US 12,331,384 B1
(45) Date of Patent: Jun. 17, 2025

(54) HIGH ENTROPY ALLOYS, REFRACTORY HIGH ENTROPY ALLOYS, METHODS OF SELECTING AND MAKING, AND STRUCTURES FORMED THEREOF

(71) Applicant: National Technology & Engineering Solutions of Sandia, LLC, Albuquerque, NM (US)

(72) Inventors: Salvador B. Rodriguez, Albuquerque, NM (US); Andrew Kustas, Elizabeth, CO (US); David Ames, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 0 days.

(21) Appl. No.: 17/879,096

(22) Filed: Aug. 2, 2022

Related U.S. Application Data

(62) Division of application No. 17/062,136, filed on Oct. 2, 2020, now Pat. No. 11,434,551.

(60) Provisional application No. 62/909,901, filed on Oct. 3, 2019.

(51) Int. Cl.

| | |
|---|---|
| *C22C 30/00* | (2006.01) |
| *B22F 10/00* | (2021.01) |
| *C22C 1/04* | (2023.01) |
| *C22C 1/10* | (2023.01) |
| *C22C 14/00* | (2006.01) |
| *C22C 16/00* | (2006.01) |
| *C22C 22/00* | (2006.01) |
| *C22C 27/02* | (2006.01) |
| *C22C 27/06* | (2006.01) |
| *B33Y 70/00* | (2020.01) |
| *B33Y 80/00* | (2015.01) |

(52) U.S. Cl.
CPC .............. *C22C 30/00* (2013.01); *B22F 10/00* (2021.01); *C22C 1/0458* (2013.01); *C22C 1/1094* (2013.01); *C22C 14/00* (2013.01); *C22C 16/00* (2013.01); *C22C 22/00* (2013.01); *C22C 27/025* (2013.01); *C22C 27/06* (2013.01); *B22F 2301/205* (2013.01); *B33Y 70/00* (2014.12); *B33Y 80/00* (2014.12)

(58) Field of Classification Search
CPC ...................................................... C22C 30/00
See application file for complete search history.

(56) References Cited

U.S. PATENT DOCUMENTS

| | | | |
|---|---|---|---|
| 4,160,014 A | 7/1979 | Gamo et al. | |
| 2002/0159914 A1* | 10/2002 | Yeh | ........................... C22C 1/02 420/580 |
| 2013/0108502 A1 | 5/2013 | Bei | |
| 2016/0326616 A1* | 11/2016 | Park | ....................... G21C 13/08 |

OTHER PUBLICATIONS

Nicholas Derimow, and Reza Abbaschian, Solidification microstructures and calculated mixing enthalpies in CoCrCu containing alloys, Materials Today Communications 15 (2018) 1-10.*
T. P. Yadav, Semanti Mukhopadhyay, S. S. Mishra, N. K. Mukhopadhyay & O. N. Srivastava (2018): Synthesis of a single phase of high-entropy Laves intermetallics in the Ti—Zr—V—Cr—Ni equiatomic alloy, Philosophical Magazine Letters, DOI: 10.1080/09500839.2017.1418539.*
Bououdina et al., Structural investigations by neutron diffraction of equi-atomic Zr—Ti(V)—Ni(Co) compounds and their related hydrides, Journal of Alloys and Compounds vols. 356-357, Aug. 11, 2003, pp. 54-58.*
Senkov, O. N. et al., "Mechanical properties of low-density, refractory multi-principal element alloys of the Cr—Nb—Ti—V—Zr system," Materials Science & Engineering A (2013) 565:51-62.

* cited by examiner

*Primary Examiner* — Christopher S Kessler
(74) *Attorney, Agent, or Firm* — Daniel J. Jenkins

(57) ABSTRACT

The present disclosure is directed to novel high entropy alloys, including refractory high entropy alloys, and methods of selecting high entropy alloys and refractory high entropy alloys with select nuclear application predetermined properties.

2 Claims, 1 Drawing Sheet

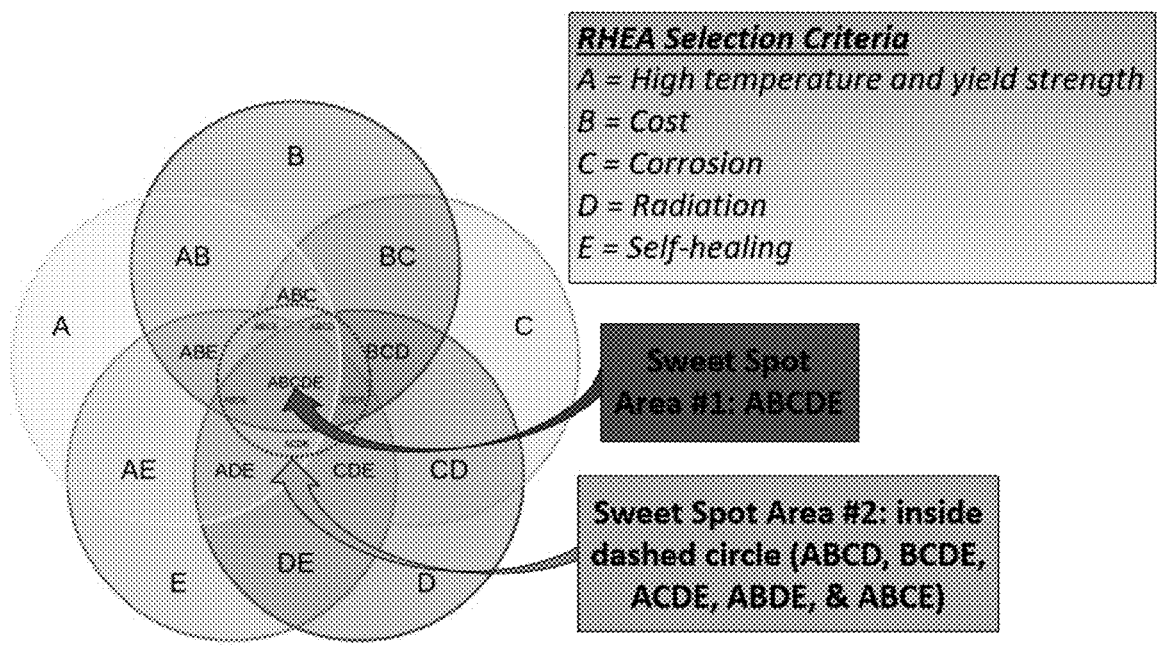

HIGH ENTROPY ALLOYS, REFRACTORY HIGH ENTROPY ALLOYS, METHODS OF SELECTING AND MAKING, AND STRUCTURES FORMED THEREOF

CROSS-REFERENCE TO RELATED APPLICATIONS

This application claims is a divisional of U.S. Ser. No. 17/062,136, entitled "HIGH ENTROPY ALLOYS, REFRACTORY HIGH ENTROPY ALLOYS, METHODS OF SELECTING AND MAKING, AND STRUCTURES FORMED THEREOF," filed Oct. 2, 2020, which claims priority to provisional patent applications U.S. Ser. No. 62/909,901, entitled "HIGH ENTROPY ALLOYS, REFRACTORY HIGH ENTROPY ALLOYS, METHODS OF SELECTING AND MAKING STRUCTURES FORMED FROM HIGH ENTROPY AND REFRACTORY HIGH ENTROPY ALLOYS," filed Oct. 3, 2019, the disclosures of which are incorporated herein by reference in their entireties.

STATEMENT OF GOVERNMENT INTEREST

The United States Government has rights in this invention pursuant to Contract No. DE-NA0003525 between the United State Department of Energy and National Technology & Engineering Solutions of Sandia, LLC, both for the operation of the Sandia National Laboratories.

FIELD

The present disclosure is generally directed to high temperature materials, and more particularly to high entropy alloys and refractory high entropy alloys and structures formed from such materials.

BACKGROUND

Advanced reactors offer a strong potential for efficient, cost-competitive energy, reduced carbon-emission, and hydrogen production for the replacement of gasoline. These reactors may become a secure and reliable energy source. Some advanced concepts involve the gas-cooled (GC) very high temperature reactor (GC-VHTR) and the molten salt (MS) cooled very high temperature reactor (MS-VHTR). Whereas most nuclear reactors operate at <700° C., these advanced reactors are designed to operate up to 1,200° C., and hence, their superior energy-efficiency. But, this high temperature challenges the integrity of most metallic nuclear-reactor materials, which have failure temperature limits<820° C. Creating additional concerns, some of the advanced reactors are cooled with high-temperature fluoride or chloride salts that are highly corrosive.

What is needed are materials that can withstand high radiation, corrosion, temperature, and pressure environments that are ideal for extending the performance of materials in high temperature applications, including current reactors, next-generation advanced, high-temperature reactors and renewable energies including concentrated solar power and smart-grids that overcomes these and other deficiencies.

SUMMARY OF THE DISCLOSURE

The present disclosure is directed to an alloy formed of five refractory elements in equiatomic or near-equiatomic amounts selected from the group consisting of Cr, Mn, Nb, Ti, V and Zr.

The present disclosure is also directed to an alloy formed of Cr, Mn, Nb, Ti, V and Zr in in equiatomic or near-equiatomic amounts.

The present disclosure is further directed to an alloy formed of three or four refractory elements selected from the group consisting of Cr, Mn, Nb, Ti, and V, and one or two transition metals selected from the group consisting of Ni and Fe. The refractory elements and transition metal are in equiatomic or near-equiatomic amounts.

The present disclosure is further directed to a method for selecting elemental constituents of a high entropy alloy and producing the high entropy alloy. The method includes selecting refractory elements having two radiation damage resistance criteria, selecting refractory elements having a minimum yield strength at predetermined temperature, selecting refractory elements having a minimum corrosion resistance, selecting refractory elements having a minimum self-healing criteria, selecting refractory elements having less than a maximum cost per unit mass; applying a binomial theorem to produce a Venn diagram to identify the selected elemental constituents, and mixing and forming the elemental constituents into the high entropy alloy.

BRIEF DESCRIPTION OF THE DRAWINGS

FIG. 1 illustrates a five-set Venn diagram produced to reduce the number RHEAs with the desired properties according to an embodiment of the disclosure.

The application will become more fully understood from the following detailed description, taken in conjunction with the accompanying figures.

DETAILED DESCRIPTION OF THE DISCLOSURE

The present disclosure is directed to high entropy alloys (HEAs) and refractory high entropy alloys (RHEAs) that can withstand high radiation, corrosion, temperature, and pressure environments that are ideal for extending the performance of materials in high temperature applications, including current reactors, next-generation advanced, high-temperature reactors and renewable energies including concentrated solar power and smart-grid applications. Additional applications include, but are not limited to, materials and sensors formed of and/or including the disclosed HEAs and RHEAs and that can survive extreme environments. Further, because of their unique property regarding very high strength at high temperature, these materials are ideal for systems where total weight is a constraint, such as in the aerospace industry. In particular, because of their high strength (as much as 10 times that of stainless steel), much less mass is required to maintain structural integrity. Furthermore, RHEAs also offer excellent corrosion resistance, for example against acid corrosion such as by nitric acid.

HEAs and RHEAs are alloys with stable single-phase microstructures containing five or more elements in near-equal atomic-fractions. HEAs are formed by combining the selected elements in roughly or nearly equimolar concentrations. Note that in this disclosure, "roughly, approximately, nearly or near-equal, hereinafter collectively referred to as "near-equal" is defined as less than or equal to 2%. The high entropy of mixing these elements stabilizes the solid-solution-like phases with relatively simple crystal structures rather than forming the conventionally expected complex intermetallic phases. Thus, while these alloys may be compositionally complex, they are microstructurally simple.

According to an embodiment of the disclosure, RHEAs having stable single-phase microstructures include equiatomic amounts of five elements selected from a group including Cr, Mn, Nb, Ti, V and Zr. In an embodiment, the RHEA may be selected from a group including MnNbTiVZr, CrNbTiVZr, CrMnTiVZr, CrMnNbVZr, CrMnNbTiZr and CrMnNbTiV. The term "high-entropy alloys" has been scientifically adopted because the entropy increase of mixing is substantially higher when there is a larger number of elements in the mix and their proportions are nearly equal.

The present disclosure is further directed to high entropy alloys (HEAs) having stable single-phase microstructures that include equiatomic amounts of three or four refractory elements selected from the group of Cr, Mn, Nb, Ti, V and Zr and one or two transition elements selected from the group of Fe, Co, and Ni that can replace one of Cr, Mn, Nb, Ti and V. In an embodiment, the HEA may be selected from the group including CrMnFeCoV, CrMnFeV, CrMnCoV, FeCoNbTiV, FeNbTiV, and CoNbTiV.

The disclosed HEAs and RHEAs can be produced by conventional casting and advanced manufacturing (AM) methods. AM methods use innovative technology to improve products or processes, with the relevant technology being described as "advanced," "innovative," or "cutting edge." Advanced manufacturing industries increasingly integrate new innovative technologies in both products and processes. The rate of technology adoption and the ability to use that technology remain competitive and add value to define the advanced manufacturing sector.

In an embodiment, the AM classification may be 3D printing, such as powder-based laser beam and electron beam additive manufacturing. These techniques are layerwise net-shape production methods for constructing complex three-dimensional components requiring little post-processing. Powder feedstock is consolidated in a layer-wise manner through the use of beds or fluidized streams of powder, with the latter enabling site-specific control of composition. These disclosed HEAs and RHEAs can be formed into nuclear components.

The present disclosure is further directed to methods to down-select RHEAs and HEAs and transition metal substituted embodiments of those RHEAs and HEAs based on high-temperature, high structural strength, and corrosion-resistance properties. The selected RHEAs and HEAs have extended RHEA and HEA performance, such that they can survive harsh environments, such as strong radiation fields, while remaining cost-competitive.

In general, RHEAs and HEAs include equal or near-equal concentrations of four to six refractory elements selected from a group that includes Manganese, Osmium, Tungsten, Technetium, Tantalum, Rhenium, Hafnium, Rhodium, Iridium, Zirconium, Niobium, Ruthenium, Molybdenum, Chromium, Vanadium, and Titanium. Because four to six elements in near-equal fractions are needed to form RHEAs, the number of permutations is large, and very expensive to research all possible individual hybrids. For example, the total number of possible RHEA combinations for five refractory elements can be computed using the binomial theorem (where ntot=total number of combinations, n=total number of elements, and k=number of elements in RHEA).

$$n_{tot} = \frac{n!}{k!(n-k)!} = \frac{16!}{5!(16-5)!} = 4,368.$$

In an embodiment, this disclosure is directed to a novel methodology to reduce the entire set of 4,368 RHEAs to five refractory elements that include six desirable properties: two radiation criteria under radiation damage resistance—low neutron absorption and low gamma interaction, high strength at the highest-possible temperature, high corrosion resistance, self-healing, and low cost per unit mass. In another embodiment, novel RHEA and HEAs, with slightly relaxed criteria, are disclosed. The resultant RHEAs are suitable for high-temperature, high-pressure, and corrosive-environments, and also offer radiation resistance at cost-competitive production.

Radiation damage is highly depended on many factors. Selecting candidate RHEA elements will vary widely depending on the desired application and environment of the system. As a first approach, the criteria developed below is applicable to a generic thermal spectrum type VHTR. Not all radiation correlation parameters have been fully evaluated. As work progresses, the criteria will be re-evaluated to include additional parameters, as needed, to select the most appropriate RHEA compositions.

Criterion 1. Radiation Damage Resistance

Radiation can cause significant damage to the crystalline structure of materials. Parameters that are correlated to radiation damage include: the radiation type (alpha, beta, photon, and neutron) energy spectra, flux, fluence, irradiation temperature, and irradiation form (pulsed vs. continuous). Additionally, the synergistic effects of corrosive media, temperature, and stress need to be evaluated along with radiation to determine the effect on the bulk material's mechanical properties over time. In nuclear reactor environments, the neutron and photon (gamma ray) radiation damage is of main concern.

In general, radiation effects can be categorized as follows:

Transmutation—Impurity production by transmutation of nuclei into other nuclei, which themselves may be a radiation source. This mechanism is caused by neutron absorption, which can result in fission or activation (capture). Impurities can also be deposited, including the creation of gases (hydrogen or helium) from proton or neutron induced reactions.

Atom Displacements—Dislodging atoms from their normal lattice sites to an interstitial position, leaving behind a vacant spot. Caused by elastic and inelastic collisions of neutrons with nuclei, recoil of a nucleus on emission of an energetic particle, and energy transfer by the replaced atoms and other secondary particles with the lattice atom.

Ionization—Removal of electrons from atoms in the material and formation of ion pairs in the path of the charged particle.

Energy Release—Large energy release in a small volume, which can result in thermal heating of the material.

Sub-Criterion 1. Low Neutron Absorption

Considering the thermal energy spectrum and typical neutron intensities, it is desirable that the RHEA elements have low neutron absorption cross-sections. This will minimize the production of impurities and nucleus displacements associated with neutron capture. In particular, elements with thermal neutron absorption cross sections less than 25 barns are considered acceptable, as they tend to absorb a smaller fraction of neutrons, and hence, result in fewer undesirable issues. This criterion is based on the observation that the refractory element thermal neutron absorption cross sections be within the ranges of 0.184 to 425 barns. For comparison, boron is a well-known neutron absorber that is referred as a "poison" in the nuclear industry because of its strong ability to capture neutrons (thermal absorption cross section of 767 barns). Application of Criterion 1 eliminates the following four refractory elements: Rhenium, Hafnium, Rhodium, and Iridium. On the other hand, the following twelve are still viable: Zirconium, Niobium, Ruthenium, Molybdenum, Chromium, Vanadium, Titanium, Manganese, Osmium, Tungsten, Technetium, and Tantalum.

Sub-Criterion 2. Low Gamma Interaction

Photons predominately interact with the atomic electrons, as opposed to neutrons which interact with the nucleus. Gamma rays do not produce impurities, but they may cause rare atom displacements via the Compton Effect. Other radiation effects are from indirect ionization and gamma heating. Ionization only has a transient effect on metals because the electrons stripped from atoms are readily replaced through the free movement of other electrons. Although the radiation damage associated with photons is expected to be low, the criteria for minimizing gamma ray interaction is applied. This means targeting elements with low atomic number and density. Therefore, lower Z elements will be selected to minimize gamma ray interactions (to avoid material damage). Subject to this criterion, Titanium, Vanadium, Chromium, and Manganese are the most ideal refractory elements because they have the lowest gamma absorption based on Z, while Zirconium, Niobium, Molybdenum, Technetium, and Ruthenium are in the mid-Z range (so they may still be useful if a less conservative criterion is viable). By contrast, Hafnium, Tantalum, Tungsten, Rhenium, Osmium, and Iridium are not selected because they have the largest Z.

Criterion 2. High Strength at the Highest-Possible Temperature

RHEAs with the following refractory elements Cr, Mn, Nb, Ti, V, and Zr show an exceptional ability to retain high yield strength at very high temperatures in the range of 850 to up to 1,400° C., while under nuclear reactor environments. The minimum yield strength of the RHEA is 300 MPa at 1,400° C. This novel, down selected set of refractory elements is obtained upon applying our Criteria for Radiation, Self-Healing, and Cost, and then comparing the remaining refractory elements with similar RHEA combinations that have high yield strength data at elevated temperatures from the literature. Thus, RHEAs with the aforementioned refractory elements consistently offer outstanding yield strength at elevated temperature.

Criterion 3. High Corrosion Resistance

RHEAs with the following refractory elements Cr, Nb, Ti, and Zr show an exceptional ability to resist corrosion at very high temperatures under nuclear reactor environments. In some embodiments with relaxed corrosion resistance, V may be included. In an embodiment, the surface corrosion current is 0.025 mA when exposed to an aqueous chloride solution based on ASTM-F746-04.

This novel, down selected set of refractory elements is obtained upon applying our Criteria for Radiation, Self-Healing, and Cost, and then comparing the four refractory elements with similar RHEA combinations that have corrosion data from the literature. This approach yields a new pattern, whereby RHEAs with Cr, Nb, Ti, and Zr consistently offer outstanding corrosion resistance under nuclear reactor environments.

Criterion 4. Self-Healing

Self-healing alloys share a consistent pattern that we cite explicitly herein for the first time: The larger the relative difference between the atomic species' van der Waals radius, the higher the propensity of the material to self-heal. Moreover, an inspection of the van der Waals radius for the 16 refractory elements shows that they tend to be grouped into three groups with the following van der Waals radius range: 179 to 186 for V, Zr, Ti, and Cr (smallest range). The next range is 195 to 210 for Tc, Mn, Ir, Nb, Ru, Mo, Tc, and W (mid range). The third range is from 212 to 217 for Hf, Os, Mo, and Re (largest range). In an embodiment, the minimum self-healing criteria is 10 displacements per atom.

Thus, RHEA combinations having a mixture from the smallest and the largest van der Waals radius groups, subject to the down selection criteria mentioned herein, will result in RHEAs for nuclear applications with the highest tendency to self-heal. Good self-healing is achievable between the smallest and mid-sized groups, as well as the mid and largest-sized group, while the least degree of self-healing is expected for RHEAs formed from within the same-sized groups.

Novel combinations with the highest potential for self-healing include MoV, MoTi, MoZr, NbTi, and NbV. The two element group with the highest propensity for self-healing is TaV, but Ta is discarded because of its high Z number. High propensity self-healing RHEAs with six elements can be formed by combining three elements each from the largest and smallest groups, but all the elements from the largest group are discarded based on the radiation and cost criteria. Thus, the RHEA with the highest propensity towards self-healing is CrNbTiVZr, as well as CrMnNbTiVZr.

Criterion 5. Low Cost per Unit Mass

An inspection of Table 1, Column 4, shows that it is reasonable to set an economic cut-off criterion to ≤the cost of nuclear-grade Zirconium ($1,600/kg) because the nuclear industry uses large amounts of purified Zirconium, which costs $1,570/kg. For example, Zircaloy-4 is much more expensive than unrefined Zirconium because there is a high-cost to refine the metal to make it nuclear grade, having <0.01% Hafnium, because Hafnium is a strong neutron poison. Both Zirconium and Hafnium tend to be found together in mines and have very similar chemical properties, hence, the difficulty in the separation process. Therefore, this economic criterion discards Ruthenium, Osmium, Technetium, Tantalum, Rhenium, Rhodium, and Iridium; most of which failed other criteria, anyway.

Upon establishment of the criterion, the binomial theorem is applied and a five-set Venn diagram (see FIG. 1) is produced to reduce the number RHEAs with the desired properties (the two radiation criteria are combined, resulting in five sets). This generates new, integrated RHEAs that are based on the novel and strategic conjunction of six key desirable nuclear reactor material properties.

Down-selection results are shown in Table 1 (* is acceptable, ** is cautionary, and is unacceptable).

TABLE 1

Criteria for Designing RHEAs for Harsh, Nuclear Environments.

| Refractory Element/ Resistance (C = corrosion, S = strength, T = temperature) | Low neutron absorption (<25 barns) | Low Gamma Absorption (Based on Z, the atomic number) | Cost ($/kg) (Cost variability due to elemental purity.) | [A]Cost ($/kg) powder form | Misc. (Corrosion, other nuclear issues) |
|---|---|---|---|---|---|
| Manganese (Mn)/T | Y/13.3* | 25* | 3.7 to 65* | 200 | |
| Titanium (Ti)/C, S, T | Y/6.09* | 22* | 4.8 to 61.2* (842 for purity at 99.5%)** | 290 | |
| Chromium (Cr)/C, S, T | Y/3.1* | 24* | 28 to 320* | 330 | May induce corrosion in MSREs? |
| Tungsten (W) | Y/18.3* | 74*** | 30 to 110* | 220 | |
| Zirconium (Zr)/C, T | Y/0.184* | 40* | 39 to 180 for unpurified Zirconium.* (99.2% pure Zirconium with 0% < Hafnium ≤ 0.2% costs $3,490/kg.) ($1,570/kg for nuclear grade-high purity) | 1,000 | |
| Niobium (Nb)/C, S, T | Y/1.15* | 41* | 42 to 180* | 1,200 | |
| Molybdenum (Mo)/C, S, T | Y/2.6* | 42** | 48 to 440* | 200 | Metallic Mo produces H2, but is acceptable in RHEA crystal form. |
| Tantalum (Ta) | Y/20.6* | 73*** | 152* to 4,500** | 1,550 | |
| Vanadium (V)/S, T | Y/5.08* | 23* | 405* to 2,200** | 4,000 | |
| Hafnium (Hf) | N/104.0*** | 72*** | 608 to 1,200* | 2,700 | |
| Rhenium (Re) | N/89.7*** | 75*** | 4,350 to 16,000*** | — | |
| Ruthenium (Ru) | Y/2.56* | 44** | 6,550 to 14,000*** | — | |
| Osmium (Os) | Y/15.0* | 76*** | 12,860 to 77,000*** | — | |
| Iridium (Ir) | N/425.0*** | 77*** | 23,000 to 42,000*** | — | |
| Technetium (Tc) | Y/20.0* | 43** | 60,000*** | — | |
| Rhodium (Rh) | N/144.8*** | 45** | 70,000 to 130,000*** | — | |
| Prealloyed Materials | | | | | |
| CoCrFeMnNi | | | | 2,000** | |
| TaNbMo | | | | 9,225 | |
| TaNbTi | | | | 8,920 | |
| AlNbMoTaTiZr | | | | 8,120 | |

[A]Note that metallic powders can be purchased, though a significant cost savings can be achieved if the hybrid LENS facility can inject individual metallic powders to form the RHEA (at about a cost of ~$1,500/kg), as opposed to buying pre-alloyed RHEA powder, which is not commercially available, and costs 2,000 to 4,000 $/kg (or more); refer to the bottom of Table 1.
*is acceptable,
**is cautionary, and
***is unacceptable.

RESULTS

Thus, a small subset of five elements simultaneously satisfy all three criteria specified above (i.e., as a Venn diagram; see FIG. 1). These six refractory elements are Zirconium, Chromium, Vanadium, Titanium, Niobium, and Manganese.

Thus, the Criteria reduce the number of elements to n=6, while k=5 remains the same. Therefore, the initial set of 4,368 RHEA combinations now reduces to six, $$n_{tot} = \frac{n!}{k!\,(n-k)!} = \frac{6!}{5!(6-5)!} = 6.$$

Sorted by alphabetical order as a standard naming convention, the sought-after RHEA elements are {Cr, Mn, Nb, Ti, V, Zr}.

The six sought-after nuclear RHEA permutations are:
MnNbTiVZr
CrNbTiVZr
CrMnTiVZr
CrMnNbVZr
CrMnNbTiZr
CrMnNbTiV It is noted that refractory elements belong to the "transition metal" group in the periodic table of elements. It is well-known that, in terms of chemical behavior, elements within a group in the periodic table tend to have similar chemically-based behavior. Therefore, it is possible to replace some of the costlier refractory elements with robust transition metals such as Iron, Cobalt, and Nickel, which have the added benefit of having low Z, and which also exhibit desirable HEA properties, e.g., FeCrMnNiCo. However, as shown in Table 2, only Iron and Nickel satisfy Criterion 1 and 2.

TABLE 2

Non-Refractory Chemically-Similar Substitutes.

| Non-Refractory Element/ Resistance (C = corrosion, S = strength, T = temperature) | Low neutron absorption (<25 barns) | Low Gamma Absorption (Based on Z) | Cost ($/kg) [Chemicool, 2019] | Cost ($/kg) powder form |
|---|---|---|---|---|
| Iron (Fe) | Y/2.56* | 26* | 0.07-1.3* | 400* |
| Nickel (Ni)/T, C | Y/4.49* | 28* | 8.9-77* | 125* |
| Cobalt (Co) | N/37.2 | 27* | 88-210* | 750* |

*is acceptable and
**is unacceptable.

In an embodiment, Vanadium can be replaced with chemically-similar iron, thereby allowing HEA combination Cr(Fe)MnNbZr, or with chemically-similar Nickel forming CrMnNb(Ni)Zr. Finally, if a few more RHEAs are desired, Criterion 2 can be relaxed to include Z in the range of 40 and additional combinations are possible.

The invention being thus described, it will be obvious that the same may be varied in many ways. Such variations are not to be regarded as a departure from the spirit and scope of the invention, and all such modifications as would be obvious to one skilled in the art are intended to be included within the scope of the appended claims. It is intended that the scope of the invention be defined by the claims appended hereto. The entire disclosures of all references, applications, patents and publications cited above are hereby incorporated by reference.

In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. An alloy selected from the group consisting of CrFeMnNbZr and CrMnNbNiZr, wherein each element is in equiatomic or near-equiatomic amounts.

2. An alloy, consisting essentially of:

Mn and two refractory elements selected from the group consisting of Cr, Nb, Ti, Zr and V; and one transition metal selected from the group consisting of Ni and Fe;

wherein the refractory elements and transition metal are in equiatomic or near-equiatomic amounts.

* * * * *